United States Patent [19]

Tres

[11] Patent Number: 4,755,024
[45] Date of Patent: Jul. 5, 1988

[54] REARVIEW MIRROR

[76] Inventor: Paul A. Tres, 2 Ridelle Avenue, Suite 508, Toronto, Ontario, Canada, M6B 1H4

[21] Appl. No.: 924,410
[22] Filed: Oct. 29, 1986
[51] Int. Cl.⁴ .......................... G02B 7/18; G02B 17/00
[52] U.S. Cl. ...................................... 350/278; 350/281
[58] Field of Search .............. 350/278, 279, 281, 484, 350/627, 626, 631–635

[56] References Cited

U.S. PATENT DOCUMENTS

| 3,692,387 | 9/1972 | Bowman et al. | 350/281 |
| 3,740,122 | 6/1973 | Stern | 350/281 |
| 4,319,806 | 3/1982 | Brandenburg | 350/281 |
| 4,436,371 | 3/1984 | Wood et al. | 350/279 |
| 4,679,906 | 7/1987 | Brandenburg | 350/281 |

Primary Examiner—Bruce Y. Arnold
Assistant Examiner—Loha Ben

[57] ABSTRACT

Housing is formed with a bendable wall at the back end of the casing. The bendable wall is in the form of two panels which are free to buckle between first and second stable positions relative to the mirror mounting seat. A mounting ball for use in mounting the housing on a mirror mounting fixture is located on the bendable wall for movement therewith such that the mirror seat may be located in the day viewing position when the bendable wall is in its first stable position and in the night viewing position when the bendable wall is in its second stable position.

11 Claims, 2 Drawing Sheets

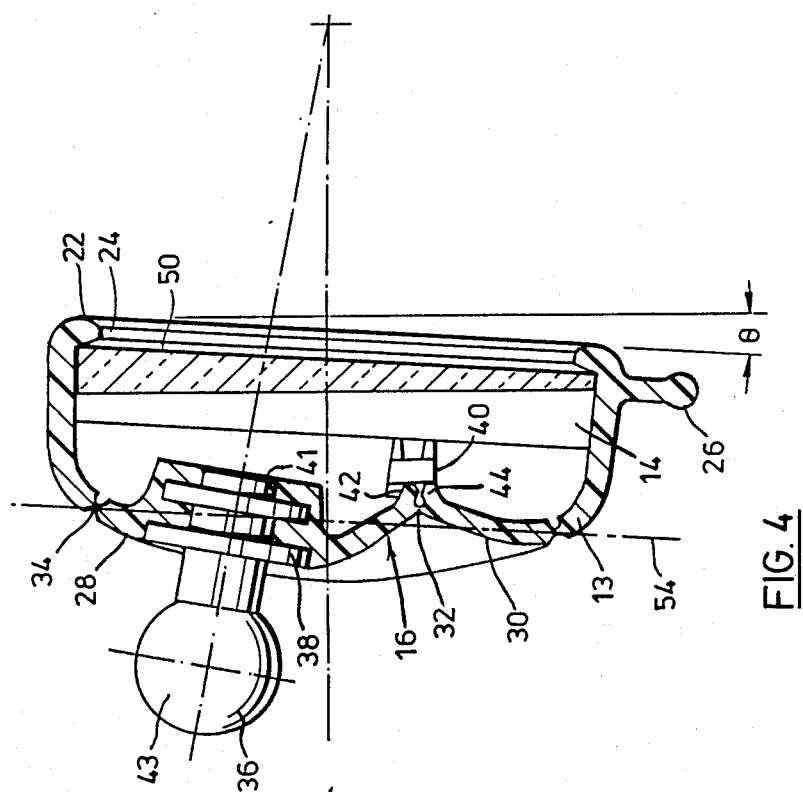
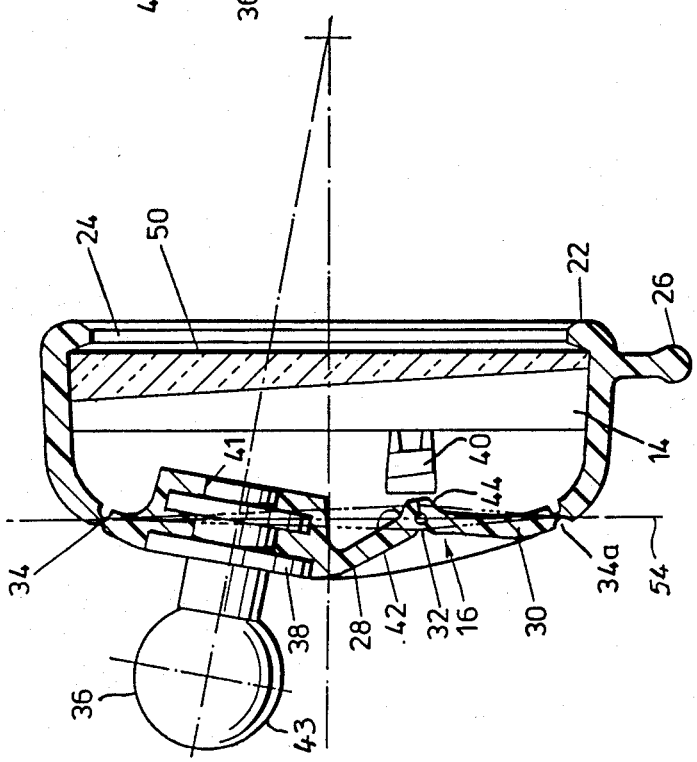

REARVIEW MIRROR

FIELD OF THE INVENTION

This invention relates to rearview mirrors. In particular, this invention relates to a rearview mirror in which the mirror housing is designed to permit movement of the mirror between day and night reflecting positions.

PRIOR ART

Various mechanisms have been proposed for the purposes of causing a mirror element to articulate between day and night positions within a mirror housing. One such mechanism is described in Canadian Pat. No. 1,180,213 issued to Donnelly Mirrors, Inc. Jan. 2, 1985. In this structure the articulating mechanism is in the form of an actuator which is formed independently of the housing and is mounted in the housing during assembly of the housing. All other day/night mirror structures known to the applicant include an actuator mechanism which is made from one or more independent parts and which is mounted in the housing during assembly. Because of the multipart instruction, day/night rearview mirrors are expensive to manufacture and assemble.

Because of the hightly competitive nature of the automobile industry, any cost reduction which can be achieved without loss of defectiveness is extremely desirable.

SUMMARY OF INVENTION

I have found that it is possible to manufacture a day/night rearview mirror in which the casing and the articulating mechanism for moving and casing between the day and night positions are formed as a unitary body. This considerably reduces the manufacturing and assembly costs leaving the only step in the assembly being the installation of the mirror.

In my mirror construction, the mirror element is held fast with respect to the housing and articulation is effected by moving the housing relative to its mounting fixture.

According to one aspect of the present invention, there is provided rearview mirror housing comprising a casing having a front end and a back end, a mirror mounting seat at the front end for retaining a mirror in a fixed position relative to the casing, a bendable wall at the back end of said casing, said bendable wall being free to buckle between first and second stable positions relative to the mirror mounting seat, mounting means for mounting said housing on a mirror mounting fixture, said mounting means being located on said bendable wall for movement therewith such that the mirror seat may be located in the day viewing position when the bendable wall is in its first stable position and in the night viewing position when the bendable wall is in its second stable position.

According to a further aspect of the present invention there is provided a rearview mirror of the type described in the preceding paragraph wherein said bendable wall comprising first and second panels which are hingedly connected to one another along a first hinge line and hingedly connected to said casing along a pair of second hinge lines arranged one on either side of the first hinge line.

Preferably, the cargo panels and casing are formed as a unitary body of plastic material and the first and second hinge connections are living hinges formed integrally with the first and second panels and casing.

PREFERRED EMBODIMENT

The invention will be more clearly understood after reference to the following detailed specification read in conjunction with the drawings wherein FIG. 1 is a perspective front view of a rearview mirror housing constructed in accordance with an embodiment of the present invention;

FIG. 3 is a sectional side view of the mirror housing of FIG. 1;

FIG. 4 is a sectional side view similar to FIG. 3 showing a second position of the bendable wall.

Figure 1:
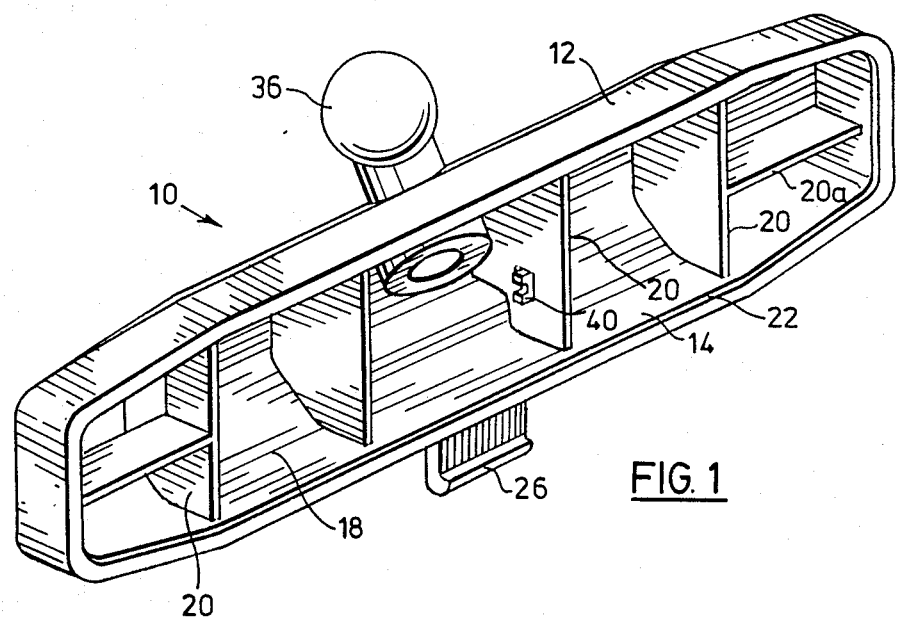
Figure 2:
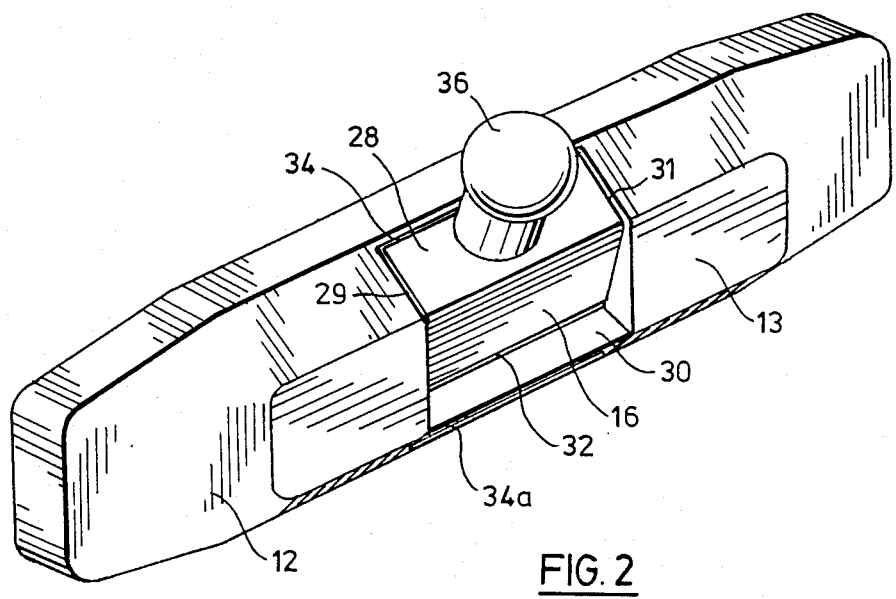
FIG. 2 is a perspective rearview of the mirror housing of FIG. 1.

With reference to FIG. 1 of the drawings, reference numeral 10 refers generally to a rearview mirror housing constructed in accordance with an embodiment of the present invention.

The housing 10 consists of a casing 12 which has a mirror mounting seat 14 at the front end thereof. The casing 12 has a back wall 13, a portion of which forms a bendable wall 16 which is free to buckle relative to the remainder of the back wall 13. The housing 12 also has a cavity 18 opening inwardly from the seat 14 within which a plurality of stiffening ribs 20 are located for the purposes of adding rigidity to the housing. The mirror seat 14 is formed between the front edges 20a of the stiffening ribs 20 and a lip 22 which extends around the perimeter of the viewing opening 24 which is formed in the front end of the casing. An actuator arm 26 is formed integrally with the casing 12 and projects downwardly therefrom. The actuating arm 26 is substantially rigid with respect to the casing 12.

In the embodiment illustrated in FIGS. 1 to 4, the bendable wall 16 comprises a first panel 28 and a second panel 30, the first panel 28 is hingedly connected to the second panel 30 along the first hinge line 32. The panels 28 and 30 are hingedly connected to the casing along second hinge lines 34 and 34a respectively. The hinges formed along the hinge lines 32, 34 and 34a are in the form of "living hinges" and are integrally formed with the casing 12 and their associated panels 28 or 30. The panels 28 and 30 have oppositely disposed side edges which are spaced from the casing 12 by slots 29 and 31 so as to be free to articulate relative to the casing 12 about the hinges 32, 34 and 34a.

A mounting member 36 has its inner end 38 seated in a mounting passage 41 which is formed in the first panel 28 and has a ball shaped outer end 43 proportioned to be fitted in a ball joint of a suitable mounting fixture.

The buckling or articulating movement of the panels 28 and 30 is limited in one direction by a pair of stops 40 formed on the stiffening ribs which are arranged at either side of the panels 28 and 30. The stops 40 serve to limit the movement of the first hinge 32 toward the front end of the casing. The movement of the first hinge 32 toward the back end of the casing is limited by shoulders 42 and 44 which are formed on the inner ends of the first and second panels 28 and 30 respectively.

When the shoulders 42 and 44 are arranged in abutting relationship they also serve to stabilize the bendable wall 16 and reduce the effects of vibrations during use in a vehicle.

A prismatic mirror 50 is mounted in the seat 14 and is retained therein by the ribs 20 and the lip 22 and is moveable relative to the mounting member 36 in response to movement of the panels 28 and 30 between the positions shown in FIGS. 3 and 4.

The ball 43 is mounted in a suitable socket in use so as the be held fast with respect to a mirror mounting fixture. In order to adjust the mirror between the day and night positions, it is merely necessary to manually engage the lever arm 26 to push the casing toward the ball 42 which will cause the panels 28 and 30 to articulate from the position shown in FIG. 3 to the position shown in FIG. 4. The articulation of the panels 28 and 30 between the position shown in FIG. 3 and the position shown in FIG. 4 causes the hinge 32 to move from one side of the centreline 54 which extends between the hinges 34 and 34a to the other side of the centreline 54. When the hinge 32 passes from one side to the other side of the centreline 54, it will automatically move toward the fully deflected position because of the "oil can" effect of the bendable wall 16. As previously indicated, the stops 42 and 44 serve to limit the movement of the panels 28 and 30 in a direction rearwardly of the centre line 54 and the stops 40 serve to limit the movement of the panels 28 and 30 forwardly of the centreline 54. The angular displacement $\theta$ of the mirror is generally about 4°.

The panels 28 and 30 are shaped and proportioned so that a significant force is required to cause movement of the panels between the first and second positions. In addition, the shape and proportions of the panels 28 and 30 serve to maintain a stress in these panels which will hold the casing stationary when the panels are in the first or second position. A displacement force can, however, be applied easily by manually engaging the actuating arm 26.

The casing 12 and panels 28 and 30 are formed from a unitary body of any suitable plastic material such as polyprolene, acetal or nylon. The casing 12 and panels 28 and 30 are preferably formed on an injection moulding process which permits simultaneous moulding of the so-called "living hinges" in a well known manner.

Various modifications of the present invention will be apparent to those skilled in the art. For example, it may be possible to form the mounting member 36 as an integral part of the panels 28 and 30. it is also possible to form the stops 40 integrally with the casing or are separate parts which are adhesively secured or otherwise fixed to the casing. The shoulders 44 and 42 may also be formed independently of the panels 30 and 28 and secured thereto after the casing is molded. In addition, by re-arranging the proportions of the panels 28 and 30, it may be possible to mount the mounting member 36 on the second or lower panel. The mirror may be any conventional type of mirror.

In yet another modification, the slots 29 and 31 which serve to separate the panels 28 and 30 from the casing may be omitted and replaced by wide "living hinges". The "living hinges" which would be required in order to connect the panels 28 and 30 are required to be sufficiently wide to permit the panels 28 and 30 to articulate between the first and second positions in use.

From the foregoing, it will be apparent that the present invention provides a simple and inexpensive rearview mirror housing in which the casing and the articulating mechanism required for moving the mirror between the day and night positions are integrally formed from a unitary body of plastics material. This construction can be easily manufactured in a one step moulding operation. Where the mounting member 36 is formed independently of the housing, it is embedded in the casing by positioning the mounting member 36 in the injection mould in which the moulding takes place thereby avoiding the need to provide a separate assembly stage for connecting the mounting member to the casing. Consequently, after moulding of the casing, the only assembly step which is required is that of inserting the mirror into the seat 14. These and other advantages of the structure of the present invention will be apparent to those skilled in the art.

I claim:

1. A rearview mirror housing comprising
   (a) a casing having a front end and a back end, a mirror mounting seat at the front end for retaining a mirror in a fixed position relative to the casing,
   (b) a bendable wall at a central portion of the back end of said casing, said bendable wall having buckle panel means formed therein which is free to buckle with respect to the remainder of the back end between first and second stable positions relative to the mirror mounting seat,
   (c) mounting means for mounting said housing on a mirror mounting fixture, said mounting means being located on said buckle panel means for movement therewith such that the mirror seat may be located in the day viewing position when the bendable wall is in its first stable position and in the night viewing position when the bendable wall is in its second stable position.

2. A rearview mirror housing comprising
   (a) a casing having a front end and a back end, a mirror mounting seat at the front end for retaining a mirror in a fixed position relative to the casing,
   (b) a bendable wall at the back end of said casing, said bendable wall comprising first and second panels which are hingedly connected to one another along a first hinge line and are hingedly connected to said casing along a pair of second hinge lines arranged one on either side of the first hinge line, said bendable wall having buckle panel means formed therein which is free to buckle with respect to the remainder of the back and between first and second stable positions relative to the mirror mounting seat,
   (c) mounting means for mounting said housing on a mirror mounting fixture, said mounting means being located on said buckle panel means for movement therewith such that the mirror seat may be located in the day viewing position when the bendable wall is in its first stable position and in the night viewing position when the bendable wall is in its second stable position.

3. A rearview mirror as claimed in claim 2 wherein said bendable wall and said casing are in the form of a unitary body.

4. A rearview mirror as claimed in claim 2 wherein said casing has a back wall at the back end thereof, said bendable wall being formed integrally with said back wall.

5. A rearview mirror as claimed in claim 4 wherein said bendable wall is connected to said back wall by means of "living hinges".

6. A rearview mirror as claimed in claim 2 wherein said first and second panels each have oppositely disposed side edges at opposite ends of said first and second hinge lines which are freely moveable with respect to the adjacent position of the back of the casing.

7. A rearview mirror as claimed in claim 6 wherein said side edges of said first and second panels are separated from the adjacent position of the back end.

8. A rearview mirror as claimed in claim 2 wherein said mirror casing and first and and second panels are formed as a unitary body of plastic material and said first and second hinge connections are "living hinges" formed integrally with the first and second panels and casing.

9. A rearview mirror as claimed in claim 2 wherein said mounting means is a mounting ball member which has a base portion embedded in said first panel and a ball portion projecting rearwardly therefrom.

10. A rearview mirror as claimed in claim 2 further comprising a prismatic mirror mounted in said mounting seat.

11. A rearview mirror as claimed in claim 10 wherein said casing is substantially rigid and said mirror is held fast with respect to said casing during movement between said day and night positions.

* * * * *